G. H. FULLER.
Manufacture of Jewelers' Findings.

No. 208,230. Patented Sept. 24, 1878.

WITNESSES.
John F Ward
Geo W Bennefield

INVENTOR.
Geo. H. Fuller
By his Attorney
Thos. P. Barnefield

UNITED STATES PATENT OFFICE.

GEORGE H. FULLER, OF PAWTUCKET, RHODE ISLAND.

IMPROVEMENT IN MANUFACTURE OF JEWELERS' FINDINGS.

Specification forming part of Letters Patent No. 208,230, dated September 24, 1878; application filed June 24, 1878.

*To all whom it may concern:*

Be it known that I, GEORGE H. FULLER, of Pawtucket, in the county of Providence and State of Rhode Island, have invented certain Improvements in the Manufacture of Jewelers' Findings, of which the following is a specification:

My said invention relates to an improved means of fastening to the wire those disks or blanks to which the ornamental parts are soldered; and consists in the use and combination of a socket-joint with the old parts in the manner substantially as hereinafter described.

In this specification my said invention is described with special reference to the manufacture and repair of ear-rings; but it is not intended to confine the device to this particular branch of the business.

The accompanying drawing is hereby made part of this specification, similar letters of reference thereon indicating corresponding parts.

Figure 1:
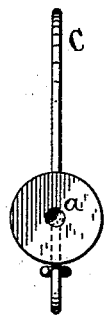
Figure 2:
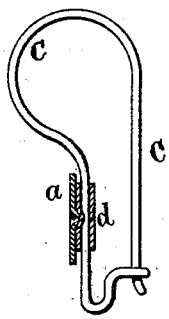
Figure 3:

Figure 1 of said drawing is a back view of said device attached to an ear-wire. Fig. 2 is a vertical sectional view thereof, and Fig. 3 shows the device in perspective.

The purpose of the disk or blank $a$ is to make a base to which to solder the drop of the ear-ring or other ornamental part. By the old method of manufacture it is common to solder the disk $a$ directly to the wire $c$. By soldering this disk directly to the wire the heat incident to the soldering process so softens the wire that it cannot be easily restiffened or brought back to its original temper.

The object of my invention is to provide a remedy for this obvious difficulty. To accomplish this I attach to said disk a cylindrical or hollow wire or socket, $d$, as seen in Fig. 3, and through this socket attachment I run the ear-wire, as seen in Fig. 2. I then puncture or indent the back of disk $a$ in such manner that the indentation shall also partially penetrate the interior wire, and force the punctured surface of said disk into the indentation in said wire, as is also seen in said Fig. 2. This firmly fastens the disk to the wire, and in a manner that will permit the parts to be subsequently heated without injury to the wire.

I claim as my invention and desire to secure by Letters Patent—

The combination of the socket $d$ with the indented disk $a$ and wire $c$, in the manner and for the purposes substantially as shown and described.

GEO. H. FULLER.

Witnesses:
   THOS. P. BARNEFIELD,
   GEO. W. BARNEFIELD.